United States Patent

Gibler

[11] Patent Number: 5,281,696
[45] Date of Patent: Jan. 25, 1994

[54] REMOVAL OF HYDROGENATION CATALYST FROM POLYMER SOLUTIONS BY TRIALKYL ALUMINUM PRECIPITATION

[75] Inventor: Carma J. Gibler, Houston, Tex.

[73] Assignee: Shell Oil Company, Houston, Tex.

[21] Appl. No.: 986,191

[22] Filed: Dec. 7, 1992

[51] Int. Cl.$^5$ ............................................. C08F 6/08
[52] U.S. Cl. ..................................... 528/485; 528/499
[58] Field of Search ............................... 528/485, 499

[56] References Cited

U.S. PATENT DOCUMENTS

| | | | |
|---|---|---|---|
| 3,012,022 | 12/1961 | Reed | 528/485 |
| 4,369,306 | 1/1983 | Toyota et al. | 528/485 |
| 5,104,972 | 4/1992 | Madgavkar et al. | 528/488 |

FOREIGN PATENT DOCUMENTS

| | | |
|---|---|---|
| 57-195715 | 12/1982 | Japan. |
| 59-217704 | 12/1984 | Japan. |
| 60-047004 | 3/1985 | Japan. |
| 1020720 | 2/1966 | United Kingdom. |

*Primary Examiner*—Bernard Lipman
*Assistant Examiner*—Tom Weber
*Attorney, Agent, or Firm*—Donald F. Haas

[57] ABSTRACT

A process is provided comprising the steps of contacting a Group VIII metal hydrogenation catalyst residue containing polymer solution with water and a trialkyl aluminum, separating the residue from the solution and recovering a polymer solution preferably comprising less than 5 ppm by weight, based on the solution, of the hydrogenation catalyst residue metal.

10 Claims, No Drawings

REMOVAL OF HYDROGENATION CATALYST FROM POLYMER SOLUTIONS BY TRIALKYL ALUMINUM PRECIPITATION

FIELD OF THE INVENTION

This invention relates to a process to prepare hydrogenated polymers. More particularly, the invention relates to the removal of residues of hydrogenation catalysts from polymer solutions.

BACKGROUND OF THE INVENTION

The uses of polymeric materials, including diolefin polymers, continues to grow rapidly in such diverse areas as protective paint coverings, wire insulations, structural panels for automobiles, piping and lubricating oil viscosity index improvers. In many of these applications, the stability of the polymer is of paramount importance. Hydrogenation of diolefin polymers greatly improves the stability of these polymers against oxidative, thermal, and ultraviolet degradation. Polymer hydrogenation processes have therefore been studied for many years as a method to prepare novel materials with excellent stability and other desirable properties. Early polymer hydrogenation processes utilized heterogeneous catalysts which were known to be useful for hydrogenation of low molecular weight olefins and aromatics. These catalyst systems included catalysts such as nickel on kieselguhr. A fine catalyst powder was preferred and large amounts of catalysts were required to complete the hydrogenation in a reasonable time. Such processes were only partially successful, since the reaction requires the diffusion of the polymer molecules into the pores of the catalyst, where the active nickel metal is present. This is a slow process when hydrogenating polymers.

Discovery of nickel 2-ethyl-1-hexanoate/triethyl aluminum hydrogenation catalyst systems enabled rapid hydrogenation of polymers. These processes utilize the catalyst as a colloidal suspension in polymer containing solutions. This type of catalyst is referred to as a homogeneous catalyst. Such a process has been used for a number of years to prepare hydrogenated isoprene-styrene block copolymers that are used as viscosity index improvers in premium motor oils. U.S. Pat. No. 3,554,991 describes an exemplary process. Besides nickel, Group VIII metals in general will function as the active metal in these systems, and in particular, iron, cobalt, and palladium are known to be acceptable.

Pore diffusion is not a limitation when homogeneous catalysts are utilized. The hydrogenation process is rapid and complete in a matter of minutes. However, removal of the catalyst from the polymer product is necessary because metals, particularly nickel, which remain with the polymer catalyze degradation of the polymer product. The removal of the catalyst from the polymer solution is commonly accomplished by the addition of an acidic aqueous solution and air to oxidize the nickel to a divalent state. The nickel and aluminum salts are soluble in the aqueous phase and can then be removed from the hydrogenated polymer solution by separation of the aqueous phase.

Alternative methods to remove hydrogenation catalyst residues from solutions of hydrogenated polymers include treatment with dicarboxylic acid and an oxidant, as disclosed in U.S. Pat. No. 4,595,749; treatment with an amine compound wherein the amine is either a chloride salt or a diamine having an alkyl group of 1 to 12 carbon atoms as disclosed by U.S. Pat. No. 4,098,991; and treatment with a non-aqueous acid followed by neutralization with an anhydrous base and filtration, as disclosed by U.S. Pat. No. 4,028,485. These processes involve contacting the polymer solution with compounds which contaminate the polymer. Further process steps can be required to remove these contaminants. U.S. Pat. Nos. 4,278,506 and 4,471,099 describe processes to remove such contaminants from hydrogenated polymer solutions. Some of these catalyst removal systems are undesirable because those processes require relatively expensive metallurgy due to the corrosive nature of the compounds. Many also require the consumption of a continuous stream of reactants and produce a sludge containing the catalyst and residues of the treatment chemicals.

It is therefore an object of this invention to provide a process to remove Group VIII metal containing hydrogenation catalyst residue from polymer solutions. It is a further object of this invention to provide a process to remove hydrogenation catalyst residue from polymer solutions which does not require the treatment of the polymer solution with phosphate compounds. In another aspect, it is an object of this invention to provide a process which is capable of removing hydrogenation catalyst residue from polymer solutions to a level of 5 ppm or less of Group VIII metal based on the solution. It is a further object to provide such a process which does not introduce a soluble contaminant into the polymer solution.

SUMMARY OF THE INVENTION

The objects of this invention are accomplished by a process comprising the steps of contacting a Group VIII metal hydrogenation catalyst residue containing polymer solution with water and triethyl aluminum or other alkyl aluminum compounds, separating the residue from the solution and recovering a polymer solution preferably comprising less than 5 ppm by weight, based on the solution, of the Group VIII metal. In a preferred embodiment, the water and the aluminum compound are contacted with the hydrogenation catalyst residue containing polymer solution by reacting in a stirred reactor or in an in-line static mixer, and the polymer solution containing less than 5 ppm of Group VIII metal is recovered by filtration or centrifugation from the resulting precipitated catalyst particles. This process has been unexpectedly found to promote the agglomeration and precipitation of the hydrogenation catalyst residues to particles which can be readily separated from the polymer solution. Further, the aluminum compound of the present invention does not contaminate the polymer or require a purification step in the polymer production process other than a physical separator.

DETAILED DESCRIPTION OF THE INVENTION

The aluminum compound of the present invention may be triethyl aluminum or another lower alkyl aluminum compound such as trimethyl aluminum or triisobutyl aluminum. There should be three alkyl groups and none of them should have more than 6 carbon atoms. The preferred aluminum compound is triethyl aluminum because of its cost, availability, effectiveness and relative ease of handling.

Sufficient trialkyl aluminum compound must be used in order to react with the Group VIII metal present in the catalyst residue so that catalyst residue particles of increased size will be formed. The larger catalyst residue particles then will precipitate out of the polymer solution. In order to accomplish this, the molar ratio of aluminum alkyl to Group VIII metal should be from 20 to 160. Preferably, the molar ratio should be from 20 to 40 because excessive alkyl aluminum is unnecessary and reduces the aluminum removal efficiency.

The addition of water is also necessary to carry out the process of the present invention and achieve the desired advantages, i.e. removal of the Group VIII metal residue from the polymer solution, preferably to a level of less than five parts per million. The water should be used in an amount from 0.05 to 0.50% by weight, preferably 0.10 to 0.30% by weight.

The polymer solutions of the present invention preferably comprise from 1 to about 40 percent by weight of a polymer, and more preferably comprise from about 2 to about 20 percent by weight of polymer based on the total amount of solution. The polymer is a partially, selectively, or totally hydrogenated polymer. The present invention does not depend upon the type of nature of the polymer. The polymer may therefore be a thermoplastic polymer, or an elastomeric polymer and may have a molecular weight which varies between wide limits. Most typically, polymers which are benefitted by hydrogenation are those comprising polymerized conjugated diolefins. These conjugated diolefin containing polymers are therefore preferred for the practice of the present invention. They may be prepared by radical, anionic or cationic polymerization and may be copolymers with other monomer units. The copolymers may be random, block, or tapered, and may have structures that are linear, branched, radial or star.

In a most preferred embodiment, the polymer is an anionically polymerized conjugated diolefin polymer which was anionically polymerized in an inert solvent and then hydrogenated in the same solvent to form the hydrogenation catalyst residue containing polymer solution.

When an anionic initiator is used, polymers will be prepared by contacting the monomers with an organoalkali metal compound in a suitable solvent at a temperature within the range from about $-100°$ C. to about 300° C., preferably at a temperature within the range from about 0° C. to about 100° C. Particularly effective polymerization initiators are organolithium compounds having the general formula:

$$RLi_n$$

Wherein:

R is an aliphatic, cycloaliphatic or aromatic hydrocarbon radical having from one to about 20 carbon atoms; and n is an integer from 1 to 4.

When the polymer is a block copolymer, the copolymer is preferably a styrene-conjugated diolefin block copolymer. This is due to the thermoplastic and elastomeric nature of these polymer. The polystyrene, being incompatible with the poly(conjugated olefins), form separate domains, and these domains have relatively high glass transition temperatures. Above the glass transition temperatures of the polystyrene domains the polymer is in a melt and can be molded, extruded or blended with other components. Below the glass transition temperature of the polystyrene, the hard polystyrene domains act as physical crosslinks between the rubbery polyconjugated diolefin chains. This result in excellent elastomer properties.

The polymer of the present invention is contacted with hydrogenation catalyst and hydrogen in a solution with an inert solvent such as cyclohexane, normal hexane, diethyl ether, toluene or benzene. The hydrogenation catalysts themselves have complex structures which are not well understood and are therefore usually described by the process used to prepare them. The hydrogenation catalyst can be prepared by combining a Group VIII metal carboxylate or alkoxide ("catalyst") with an alkyl or hydride of a metal selected from Groups I-A, II-A and III-B of Medeleev's Periodic Table of Elements ("cocatalyst"). The preparation of such catalysts is taught in U.S. Pat. Nos. 3,591,064 and 4,028,485, which are incorporated herein by reference.

Typically, between about 0.09 and about 10 mmoles of Group VIII metal is utilized per 100 grams of polymer to be hydrogenated. This corresponds to about 0.1 to 13 mmoles of Group VIII metal per liter of solution.

The catalyst metals which are preferred include iron, cobalt, nickel and palladium. Nickel and cobalt are particularly preferred. Iron is not particularly preferred because it is less active than the others and palladium is not particularly preferred because it is more expensive than nickel and cobalt. Lithium, magnesium and aluminum are preferred cocatalysts due to the excellent activity of the resulting cocatalyst.

The hydrogenation catalysts are insoluble in the polymer solutions and form a colloidal suspension. The trialkyl aluminum may react with a portion of the Group VIII metal ions and remove the hydrogenation catalyst by this attachment, but the result is that the process promotes the agglomeration of the colloidal particles into particles which are capable of being separated from the polymer solution by conventional means.

The hydrogenation catalyst residue containing polymer solution is contacted with the water and trialkyl aluminum either in a continuous process or in a batch process. The contact is preferably carried out by reacting in a stirred reactor or in an in-line static mixer.

The treated polymer solution may be recovered from the trialkyl aluminum/water/polymer solution mixture by any known means to separate solids from viscous liquids. Centrifugal means such as centrifuges or cyclones may be utilized. Filtering, preferably in the presence of a filter aid may also be utilized, along with gravity settlement such as decantation, or sedimentation in parallel plate separators. Filtering utilizing a filter aid is preferred because this method is known to be effective to separate fine particles from polymer solutions.

EXAMPLE 1

Preparation of Polymer Feed

A batch of polystyrene-polybutadiene-polystyrene (S—B—S) block copolymer, 50,000 molecular weight and 30% by weight styrene, was made by anionic polymerization using sec-butyllithium as the initiator. The polymerization took place in a mixture of cyclohexane and diethyl ether. The living polymer was terminated with methanol. The resulting polymer solution contained 12% polymer by weight.

The hydrogenation catalyst was produced by the reaction of 1 mole of nickel 2-ethyl-1-hexanoate with 2.1 moles of triethyl aluminum (TEA). The hydrogenation catalyst was added to the polymer solution and hydrogenation of >98% of the diene block of the S—B—S block copolymer occurred.

EXAMPLE 2

Precipitation of the Nickel/Aluminum Catalyst Using Hydrogenated S—B—S Feed

Twenty-five grams of the hydrogenated S—B—S feed in Example 1 were added to jars for samples 1-6. For samples 7-12, 12.5 grams of the hydrogenated S—B—S feed and 12.5 grams of cyclohexane were added to the jars. Water was then added to the jars, and the jars were capped and placed on a mechanical shaker overnight. The next day, the jars were placed in a dry box and triethyl aluminum (15% by weight in a solution of cyclohexane) was added to the jars containing the polymer solution and the water. No further agitation occurred, but precipitation started to occur in the 6% by weight polymer solutions within about 90 minutes. Within two days, a precipitate had formed in all solutions and a clear polymer versus gray polymer solution was apparent. After 7 days, the clear polymer solution was analyzed for nickel and aluminum. The conditions and treated solution concentrations of nickel and aluminum are shown in Table 1.

TABLE 1

| Sample | Percent Weight Polymer | Water Amount G | TEA Amount G | Initial Concentration | | Treated Solution | |
|---|---|---|---|---|---|---|---|
| | | | | Nickel PPM | Aluminum PPM | Nickel PPM | Aluminum PPM |
| 1 | 12 | 0.035 | 0.148 | 151.5 | 166.4 | 2.1 | 6.3 |
| 2 | 12 | 0.035 | 0.296 | 151.5 | 166.4 | 1.6 | 10.9 |
| 3 | 12 | 0.035 | 0.592 | 151.5 | 166.4 | 14.7 | 148.6 |
| 4 | 12 | 0.070 | 0.148 | 151.5 | 166.4 | 1.2 | 1.7 |
| 5 | 12 | 0.070 | 0.296 | 151.5 | 166.4 | 3.6 | 9.8 |
| 6 | 12 | 0.070 | 0.592 | 151.5 | 166.4 | 2.0 | 12.3 |
| 7 | 6 | 0.035 | 0.148 | 75.8 | 83.2 | 3.8 | 12.5 |
| 8 | 6 | 0.035 | 0.296 | 75.8 | 83.2 | 2.6 | 19.0 |
| 9 | 6 | 0.035 | 0.592 | 75.8 | 83.2 | 2.1 | 102.4 |
| 10 | 6 | 0.070 | 0.148 | 75.8 | 83.2 | 0.8 | 5.8 |
| 11 | 6 | 0.070 | 0.296 | 75.8 | 83.2 | 14.0 | 134.6 |
| 12 | 6 | 0.070 | 0.592 | 75.8 | 83.2 | 0.9 | 7.6 |

I claim:

1. A process to remove Group VIII metal hydrogenation catalyst residue from a polymer comprising:

(a) reacting a Group VIII metal hydrogenation catalyst residue containing polymer solution with water and an aluminum trialkyl; and (b) separating the catalyst residue from the polymer solution; and (c) recovering the polymer solution.

2. The process of claim 1 wherein the molar ratio of trialkyl aluminum to Group VIII metal is from 20 to 160.

3. The process of claim 2 wherein said ratio is from 20 to 40.

4. The process of claim 1 wherein the water added to the polymer solution is added in an amount from 0.05 to 0.50 wt%.

5. The process of claim 4 wherein the water is added in an amount from 0.10 to 0.30 wt%.

6. The process of claim 1 wherein the Group VIII metal is nickel.

7. The process of claim 1 wherein the trialkyl aluminum is triethyl aluminum.

8. The process of claim 1 wherein the catalyst residue is separated from the polymer solution by filtration.

9. The process of claim 1 wherein the catalyst residue is separated from the polymer solution by centrifugation.

10. The process of claim 1 wherein the catalyst residue is separated from the polymer solution by gravity settlement.

* * * * *